United States Patent
Choi et al.

(10) Patent No.: US 12,475,678 B2
(45) Date of Patent: Nov. 18, 2025

(54) METHOD AND APPARATUS FOR DETECTING CHANGES BETWEEN HETEROGENEOUS IMAGE DATA FOR IDENTIFYING DISASTER DAMAGE

(71) Applicant: KAKAO MOBILITY CORP., Gyeonggi-do (KR)

(72) Inventors: Yoon Jo Choi, Gyeonggi-do (KR); Seung Hwan Hong, Gyeonggi-do (KR); Mohammad Gholami Farkoushi, East Azarbayjan Province (IR)

(73) Assignee: KAKAO MOBILITY CORP., Gyeonggi-do (KR)

( * ) Notice: Subject to any disclaimer, the term of this patent is extended or adjusted under 35 U.S.C. 154(b) by 262 days.

(21) Appl. No.: 17/989,263

(22) Filed: Nov. 17, 2022

(65) Prior Publication Data

US 2024/0185560 A1    Jun. 6, 2024

(30) Foreign Application Priority Data

Oct. 24, 2022   (KR) .................. 10-2022-0137190

(51) Int. Cl.
  *G06V 10/74* (2022.01)
  *G06V 10/25* (2022.01)
  *G06V 10/46* (2022.01)

(52) U.S. Cl.
  CPC .............. *G06V 10/74* (2022.01); *G06V 10/25* (2022.01); *G06V 10/462* (2022.01)

(58) Field of Classification Search
  CPC ...... G06V 10/74; G06V 10/25; G06V 10/462; G06V 20/13; G01J 3/2823; G06T 7/11; G06T 7/254; G06T 2207/10036
  See application file for complete search history.

(56) References Cited

U.S. PATENT DOCUMENTS

2024/0029430 A1 * 1/2024 Jensen ................ G06V 20/188
2024/0070845 A1 * 2/2024 Scharf ................... G06V 20/13

FOREIGN PATENT DOCUMENTS

CN        107992891 B  *  1/2022   ........... G06K 9/6223

OTHER PUBLICATIONS

Hou, B., Wang, Y., & Liu, Q. (2016). A Saliency Guided Semi-Supervised Building Change Detection Method for High Resolution Remote Sensing Images. Sensors (Basel, Switzerland), 16(9), 1377. https://doi.org/10.3390/s16091377 (Year: 2016).*

(Continued)

*Primary Examiner* — Matthew C Bella
*Assistant Examiner* — Janice E. Vaz
(74) *Attorney, Agent, or Firm* — IP Legal Services, LLC

(57) ABSTRACT

Disclosed herein method and apparatus for detecting changes between heterogeneous image data for identifying disaster damage.
The method includes obtaining observation image data of an event occurrence region and reference image data that occurs before an event and has a heterogeneous type of an image from the observation image data; processing the observation image data and the reference image data according to an attribute of the observation image data and preprocessing the observation image data and the reference image data to determine whether or not there is an exceptional object to be excluded from a change analysis in the processed observation image data and the processed reference image data based on an event type and to process the exceptional object; and detecting a change area of the event occurrence region based on the preprocessed observation image data and the preprocessed reference image data.

7 Claims, 8 Drawing Sheets

(56) References Cited

OTHER PUBLICATIONS

Y. -C. Kim, T. -W. Bae and S. -H. Ahn, "Background subtraction with shadow removal using hue and texture model for moving object detection," 2020 International Conference on Electronics, Information, and Communication (ICEIC), Barcelona, Spain, 2020, pp. 1-2, doi: 10.1109/ICEIC49074.2020.9051164. (Year: 2020).*

N. Salamati, A. Germain and S. Siisstrunk, "Removing shadows from images using color and near-infrared," 2011 18th IEEE International Conference on Image Processing, Brussels, Belgium, 2011, pp. 1713-1716, doi: 10.1109/ICIP.2011.6115788. (Year: 2011).*

Yady Tatiana Solano-Correa et al., "An Approach for Unsupervised Change Detection in Multitemporal VHR Images Acquired by Different Multispectral Sensors", Remote Sens., 2018, pp. 1-23.

George P. Petropoulos et al., "Quantifying spatial and temporal vegetation recovery dynamics following a wildfire event in a Mediterranean landscape using EO data and GIS", Applied Geography, 2014, pp. 120-131.

Anastasios L. Fytsilis et al., "A methodology for near real-time change detection between Unmanned Aerial Vehicle and wide area satellite images", ISPRS Journal of Photogrammetry and Remote Sensing, 2016, pp. 165-186.

\* cited by examiner (a)          (b)

FIG. 8
 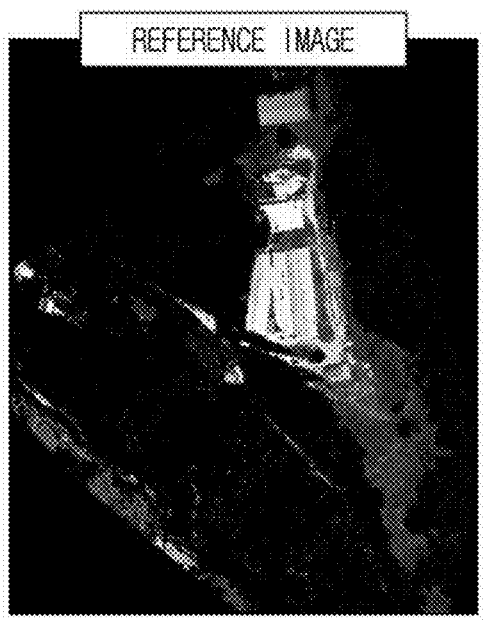
(a) (b)

FIG. 9
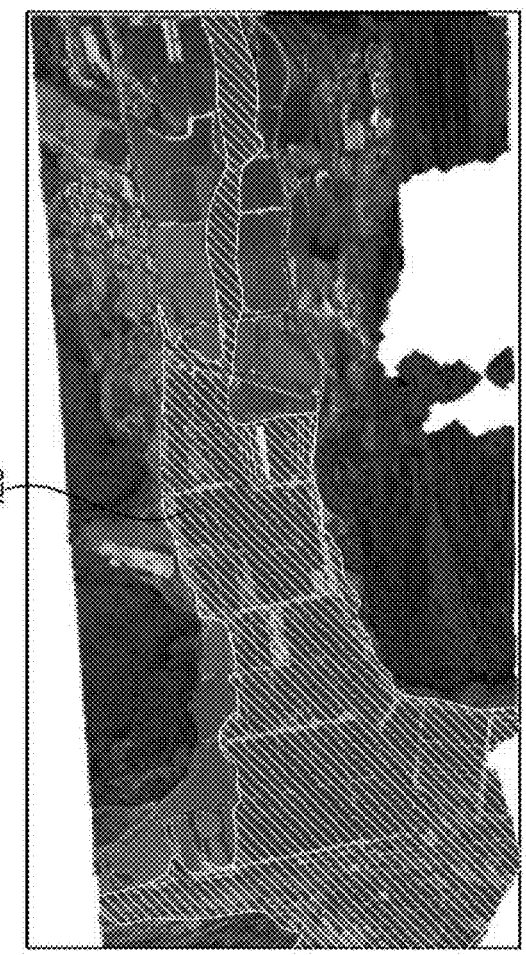
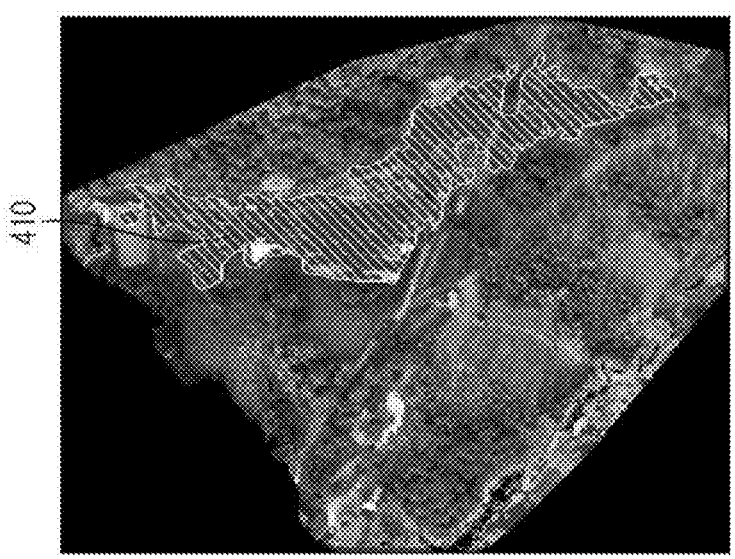

METHOD AND APPARATUS FOR DETECTING CHANGES BETWEEN HETEROGENEOUS IMAGE DATA FOR IDENTIFYING DISASTER DAMAGE

CROSS REFERENCE TO RELATED APPLICATION

The present application claims priority to a Korean patent application 10-2022-0137190, filed Oct. 24, 2022, the entire contents of which are incorporated herein for all purposes by this reference.

BACKGROUND OF THE INVENTION

Field of the Invention

The present disclosure relates to a method and apparatus for detecting a change between heterogeneous image data for identifying disaster damage and, more particularly, to a method and apparatus for detecting a change between heterogeneous image data, which accurately detect a change between an observation image and a reference image, for example, a damaged area before and after a disaster by processing an image according to an event type and a device type for obtaining observation and reference images.

Description of the Related Art

Available platforms for identifying an area struck by a disaster may be a satellite, an unmanned aerial device, a CCTV, a smartphone, and the like. CCTVs and smartphones have limitations in detecting a damaged area because image data are obtained from the human's view. On the other hand, in the cases of satellites and unmanned aerial devices, as image data is obtained in space or in the air, an ortho-image may be produced to analyze a damaged area of a large district.

Conventionally, satellite images are used to detect a damage-stricken area. Satellite images efficiently take damage information for a wide area, and as data is collected at a predetermined period, data collected before and after the outbreak of a disaster is utilized. The area of damage is identified by detecting a change based on satellite images collected before and after a disaster.

However, as the detection of a change based on satellite images is performed based on a predetermined track and a predetermined period, a damaged area may not belong to a region taken by a satellite, or a damaged area may not be taken at a necessary time.

Unlike a satellite that periodically observes the ground, an unmanned aerial device is capable of approaching a disaster area when an unpredictable disaster occurs and of obtaining disaster-related data. In addition, as an unmanned aerial device is also capable of reaching a place almost inaccessible to people, its availability tends to increase in recent disastrous situations.

However, as an unmanned aerial device normally acquires data after the outbreak of a disastrous situation, there is no reference image for detecting a damaged area, and an existing automated algorithm has limitations in identifying a damage area.

A satellite image or an aerial ortho-image, which is taken before a disaster, is employed as a reference image, and detection of a change in a region caused by a disaster is attempted based on an image taken by an unmanned aerial device after the disaster and an image taken before the disaster. However, since an image of an unmanned aerial device and an image before a disaster may have different attributes applied to each of them, for example, different sensors, an error may occur in detecting a changed area. In addition, when such a changed area is identified without consideration of a disaster type, the accuracy of change detection is significantly degraded.

SUMMARY

A technical object of the present disclosure is provide a method and apparatus for detecting a change between heterogeneous image data for identifying disaster damage, which accurately detect a change between an observation image and a reference image, for example, a damaged area before and after a disaster by processing an image according to an event type and a device type for obtaining observation and reference images.

The technical objects of the present disclosure are not limited to the above-mentioned technical objects, and other technical objects that are not mentioned will be clearly understood by those skilled in the art through the following descriptions.

According to the present disclosure, there is provided a method for detecting a change between heterogeneous image data, the method comprising: obtaining observation image data of an event occurrence region and reference image data that occurs before an event and has a heterogeneous type of an image from the observation image data; processing the observation image data and the reference image data according to an attribute of the observation image data and preprocessing the observation image data and the reference image data to determine whether or not there is an exceptional object to be excluded from a change analysis in the processed observation image data and the processed reference image data based on an event type and to process the exceptional object; and detecting a change area of the event occurrence region based on the preprocessed observation image data and the preprocessed reference image data.

According to the embodiment of the present disclosure in the method, the attribute of the observation image data may be determined according to a type of an observation image sensor, and the type of the observation image sensor is an optical sensor with a RGB band or a multispectral sensor identifying an object with a specific spectral characteristic.

According to the embodiment of the present disclosure in the method, the observation image data may be generated by using an unmanned aerial device, and image data corresponding to the type of the observation image sensor, among a plurality of types of image data, may be adopted as the reference image data.

According to the embodiment of the present disclosure in the method, the processing of the observation image data and the reference image data may comprise, based on a color associated with a designated object, processing to identify the designated object in the observation image data and reference image data with the type of the observation image sensor when the type of the observation image sensor is the optical sensor. The processing of the observation image data and the reference image data may comprise, based on a reflectance according to a specific wavelength associated with the designated object, processing to identify the designated object in the observation image data and the reference image data with the type of the observation image sensor when the type of the observation image sensor is the multispectral sensor.

According to the embodiment of the present disclosure in the method, the preprocessing of the observation image data and the reference image data may comprise determining, based on the event type, whether or not the identified designated object is the exceptional object; excluding the exceptional object from the processed observation image data and the processed reference image data when the designated object is determined as the exceptional object; and maintaining the designated object in the processed observation image data and the processed reference image data when the designated object is determined not to correspond to the exceptional object.

According to the embodiment of the present disclosure in the method, the detecting of the change area of the event occurrence region may comprise extracting a potential change area between the preprocessed observation image data and the preprocessed reference image data; and detecting a final change area based on difference image data between the observation image data and the reference image data in which the potential change area is extracted.

According to the embodiment of the present disclosure in the method, the extracting of the potential change area may comprise applying a change vector analysis (CVA) to the preprocessed observation image data and the preprocessed reference image data; and detecting a saliency area with a dissimilarity equal to or above a threshold based on the observation image data and the reference image data to which the analysis is applied and extracting the detected saliency area as the potential change area.

According to the embodiment of the present disclosure in the method, the detecting of the final change area based on the difference image data may be performed by using principal component analysis K-means (PCA K-means) for the difference image data.

According to the embodiment of the present disclosure in the method, the event may be a disaster, the event occurrence region may be a region damaged by the disaster, and the event type may be a disaster type.

According to another embodiment of the present disclosure, there is provided a gaze tracking device, the device comprising: a communication unit configured to externally transmit and receive a signal; a memory configured to store at least one instruction; and a processor configured to execute the at least one instruction stored in the memory. The processor is further configured to: obtain observation image data of an event occurrence region and reference image data that occurs before an event and has a heterogeneous type of an image from the observation image data, process the observation image data and the reference image data according to an attribute of the observation image data and preprocess the observation image data and the reference image data to determine whether or not there is an exceptional object to be excluded from a change analysis in the processed observation image data and the processed reference image data based on an event type and to process the exceptional object, and detect a change area of the event occurrence region based on the preprocessed observation image data and the preprocessed reference image data.

According to the embodiment of the present disclosure in the device, the attribute of the observation image data may be determined according to a type of an observation image sensor, and the type of the observation image sensor is an optical sensor with a RGB band or a multispectral sensor identifying an object with a specific spectral characteristic.

According to the embodiment of the present disclosure in the device, the observation image data may be generated by using an unmanned aerial device, and image data corresponding to the type of the observation image sensor, among a plurality of types of image data, may be adopted as the reference image data.

According to the embodiment of the present disclosure in the device, the processing of the observation image data and the reference image data may comprise, based on a color associated with a designated object, processing to identify the designated object in the observation image data and reference image data with the type of the observation image sensor when the type of the observation image sensor is the optical sensor. The processing of the observation image data and the reference image data may comprise, based on a reflectance according to a specific wavelength associated with the designated object, processing to identify the designated object in the observation image data and the reference image data with the type of the observation image sensor when the type of the observation image sensor is the multispectral sensor.

According to the embodiment of the present disclosure in the device, the preprocessing of the observation image data and the reference image data may comprise determining, based on the event type, whether or not the identified designated object is the exceptional object; excluding the exceptional object from the processed observation image data and the processed reference image data when the designated object is determined as the exceptional object; and maintaining the designated object in the processed observation image data and the processed reference image data when the designated object is determined not to correspond to the exceptional object.

According to the embodiment of the present disclosure in the device, the detecting of the change area of the event occurrence region may comprise extracting a potential change area between the preprocessed observation image data and the preprocessed reference image data; and detecting a final change area based on difference image data between the observation image data and the reference image data in which the potential change area is extracted.

According to the embodiment of the present disclosure in the device, the extracting of the potential change area may comprise applying a change vector analysis (CVA) to the preprocessed observation image data and the preprocessed reference image data; and detecting a saliency area with a dissimilarity equal to or above a threshold based on the observation image data and the reference image data to which the analysis is applied and extracting the detected saliency area as the potential change area.

According to the embodiment of the present disclosure in the device, the detecting of the final change area based on the difference image data may be performed by using principal component analysis K-means (PCA K-means) for the difference image data.

According to the embodiment of the present disclosure in the device, the event may be a disaster, the event occurrence region may be a region damaged by the disaster, and the event type may be a disaster type.

The features briefly summarized above for this disclosure are only exemplary aspects of the detailed description of the disclosure which follow, and are not intended to limit the scope of the disclosure.

According to the present disclosure, it is possible to provide a method and apparatus for detecting a change between heterogeneous image data for identifying disaster damage, which accurately detect a change between an observation image and a reference image, for example, a damaged area before and after a disaster by processing an image according to an event type and a device type for obtaining observation and reference images.

Effects obtained in the present disclosure are not limited to the above-mentioned effects, and other effects not mentioned above may be clearly understood by those skilled in the art from the following description.

The technical problems solved by the present disclosure are not limited to the above technical problems and other technical problems which are not described herein will be clearly understood by a person (hereinafter referred to as an ordinary technician) having ordinary skill in the technical field, to which the present disclosure belongs, from the following description.

BRIEF DESCRIPTION OF THE DRAWINGS

FIG. 8 is a view exemplifying images of observation and reference image data from which a potential change area is extracted.

FIG. 9 is a view exemplifying an image analysis result for a damaged area according to a disaster type.

DETAILED DESCRIPTION

Figure 1:
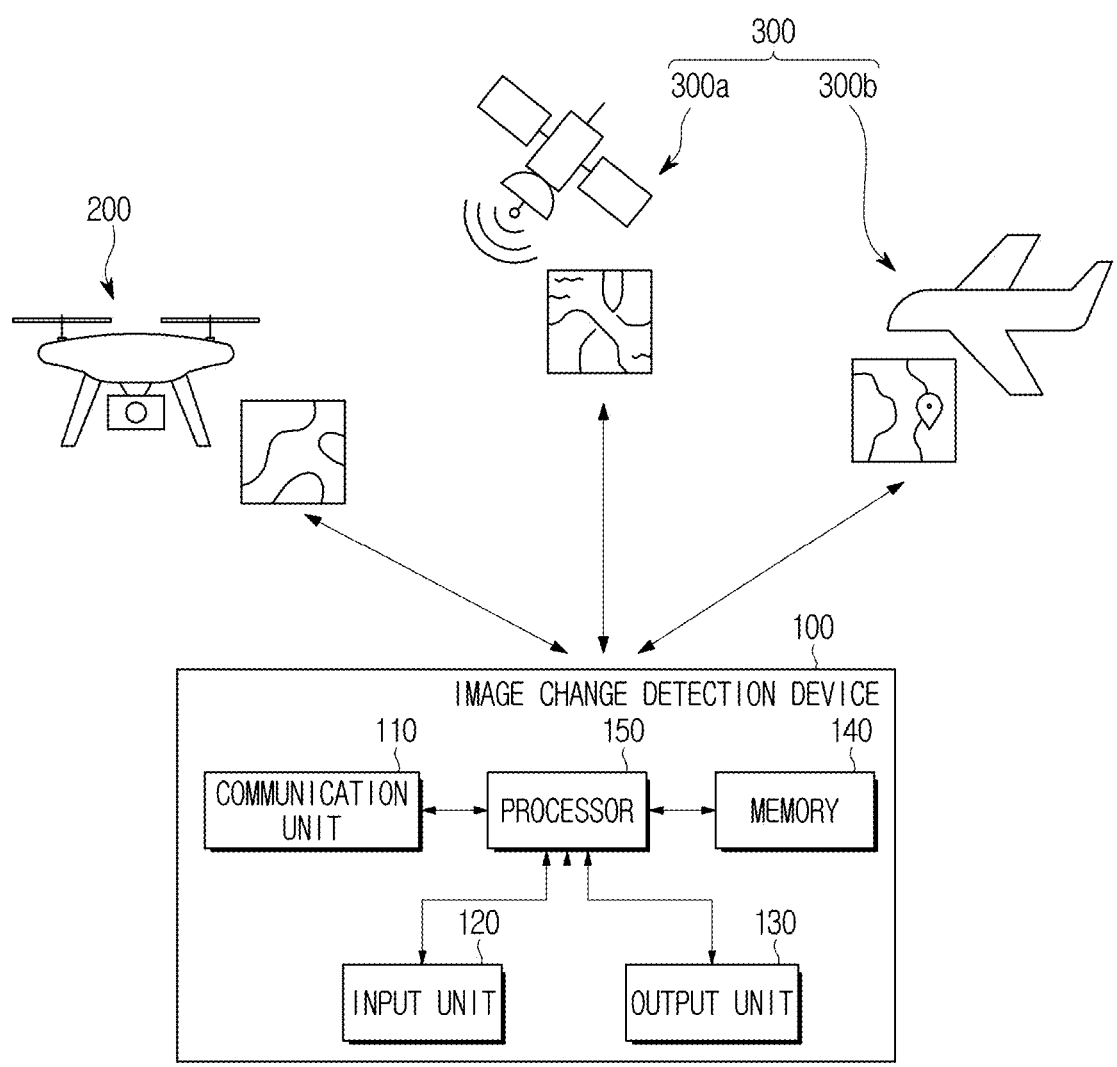
FIG. 1 is a view exemplifying a system including a change detection device for heterogeneous image data according to an embodiment of the present disclosure.

Hereinafter, exemplary embodiments of the present disclosure will be described in detail with reference to the accompanying drawings so that those skilled in the art may easily implement the present disclosure. However, the present disclosure may be implemented in various different ways, and is not limited to the embodiments described therein.

In describing exemplary embodiments of the present disclosure, well-known functions or constructions will not be described in detail since they may unnecessarily obscure the understanding of the present disclosure. The same constituent elements in the drawings are denoted by the same reference numerals, and a repeated description of the same elements will be omitted.

In the present disclosure, when an element is simply referred to as being "connected to", "coupled to" or "linked to" another element, this may mean that an element is "directly connected to", "directly coupled to" or "directly linked to" another element or is connected to, coupled to or linked to another element with the other element intervening therebetween. In addition, when an element "includes" or "has" another element, this means that one element may further include another element without excluding another component unless specifically stated otherwise.

In the present disclosure, the terms first, second, etc. are only used to distinguish one element from another and do not limit the order or the degree of importance between the elements unless specifically mentioned. Accordingly, a first element in an embodiment could be termed a second element in another embodiment, and, similarly, a second element in an embodiment could be termed a first element in another embodiment, without departing from the scope of the present disclosure.

In the present disclosure, elements that are distinguished from each other are for clearly describing each feature, and do not necessarily mean that the elements are separated. That is, a plurality of elements may be integrated in one hardware or software unit, or one element may be distributed and formed in a plurality of hardware or software units. Therefore, even if not mentioned otherwise, such integrated or distributed embodiments are included in the scope of the present disclosure.

In the present disclosure, elements described in various embodiments do not necessarily mean essential elements, and some of them may be optional elements. Therefore, an embodiment composed of a subset of elements described in an embodiment is also included in the scope of the present disclosure. In addition, embodiments including other elements in addition to the elements described in the various embodiments are also included in the scope of the present disclosure.

The advantages and features of the present invention and the way of attaining them will become apparent with reference to embodiments described below in detail in conjunction with the accompanying drawings. Embodiments, however, may be embodied in many different forms and should not be constructed as being limited to example embodiments set forth herein. Rather, these embodiments are provided so that this disclosure will be complete and will fully convey the scope of the invention to those skilled in the art.

In the present disclosure, each of phrases such as "A or B", "at least one of A and B", "at least one of A or B", "A, B or C", "at least one of A, B and C", ""at Each of the phrases such as"at least one of A, B or C" and "at least one of A, B, C or combination thereof" may include any one or all possible combinations of the items listed together in the corresponding one of the phrases.

Hereinafter, embodiments of the present disclosure will be described with reference to the accompanying drawings.

FIG. 1 is a view exemplifying a system including a change detection device for heterogeneous image data according to an embodiment of the present disclosure.

A system for detecting a change between heterogeneous image data may generate a change map after the occurrence of an event by sensing a change area between reference image data before the occurrence of the event and observation image data after the occurrence of the event in a region where the event occurs.

The system may include an image change detection device 100, an unmanned aerial device (or drone) 200 for obtaining relevant regional data affected by an event in a region where the event occurs, and an airborne device 300 for obtaining, in space beyond the atmosphere or in the atmosphere, relevant data of a wide region covering a region where an event occurs.

The image change detection device 100 may be a device for detecting a change between heterogeneous image data for identifying the influence of an event according to the present disclosure. Heterogeneous image data may mean that image data obtained before and after an event are received from devices having different types to each other, for example, the unmanned aerial device 200 and the airborne device 300. An image obtained by the unmanned aerial device 200 may be a type of observation image data that is taken for an object in a corresponding region after the occurrence of an event. An image obtained by the airborne device 300 may be a type of reference image data that is periodically taken for an object in a corresponding region before the occurrence of an event.

Image data obtained from the unmanned aerial device 200 and the airborne device 300 may be different from each other with respect to a shooting region, a shooting time, internal and external geometry information, a noise, a device type, and a property of an output image. The image change detection device 100 may generate a change map of a corresponding region by detecting the influence or change caused by an event in the corresponding region based on heterogeneous image data before and after the occurrence of the event. A detailed configuration of the image change detection device 100 will be described below.

The unmanned aerial device 200 may be provided as various types of platforms like fixed wing, rotary wing, vertical take-off and landing (VTOL), and multicopter. The unmanned aerial device 200 may be equipped with a module with a shooting method according to necessary data types like a 3D model and an ortho-image. The above-listed unmanned aerial device 200 may collect image data for creating an ortho-image and process vertical shooting by setting an overlap and a shooting altitude in order to create the ortho-image. An ortho-image of the unmanned aerial device 200 usually has a spatial resolution of centimeters and is very efficient to detect a disaster situation and a damage situation. Specifically, as the unmanned aerial device 200 obtains a centimeter-level high resolution image, an image of the unmanned aerial device 200 may contribute to identifying not only a disaster type over a wide area but also a small-scale damaged area. In addition, the unmanned aerial device 200 may obtain ortho-image data with high resolution by designating a time and a region desired by a manager.

The airborne device 300 may periodically obtain relevant data of a wide area in space beyond the atmosphere or in the atmosphere. For example, the airborne device 300 may include an aircraft 300*b* flying in the atmosphere apart from a satellite 300*a*, which periodically revolves around the earth in space, and an unmanned aerial device 200.

The satellite 300*a* may be equipped with a module for collecting image data for a wide area periodically. The wide area may be an entire territory of a specific state or a part of the territory according to a management policy (or manager setting). The interval may be determined according to a revolution period of the satellite. Unlike the unmanned aerial device 200, the satellite 300*a* may not be able to obtain image data at an appropriate time in an unpredictable disaster situation. Images of the satellite 300*a* have different spatial resolutions according to a satellite type but usually enable only a large-scale disaster type like a forest fire and a typhoon to be identified. As compared with aerial images to be described below, satellite images have low resolutions, but since an image collection module for satellites is equipped with a multispectral sensor, various types of image data and relevant information may be collected.

The aircraft 300*b* may be equipped with a module for collecting periodically image data for a wide area at a lower altitude than that of the satellite 300*a*. The shooting period of the aircraft 300*b* and the satellite 300*a* may be identical or different according to a management policy (or manager setting). The wide area may be an entire territory of a specific state or a part of the territory according to a management policy (or manager setting). In addition, images obtained from the satellite 300*a* and the aircraft 300*b* may have a same regional range or different regional ranges. An image collection module for an aircraft may be configured as a color-based (or RGB) optical sensor with a resolution of, for example, 12 cm or 25 cm. An aerial image may be produced to have a higher resolution than a satellite image.

The image change detection device 100 may include, for example, a communication unit 110 for transmitting and receiving an image and information, an input unit 120, an output unit 130, a memory 140, and a processor 150.

The communication unit 110 may periodically receive an image from at least one of the satellite 300*a* and the aircraft 300*b* and, when an event occurs, receive, from the unmanned aerial device 200, an image of an area in which the event occurs. In the present disclosure, an image of the satellite 300*a* and an image of the aircraft 300*b* may be abbreviated to satellite image and aerial image respectively, and an image of the unmanned aerial device 200 may be referred to as observation image. As described above, a satellite image and an aerial image may be periodically obtained irrespective of the occurrence of an event and be an image of a wide area including an area where the event occurs. In the present disclosure, a satellite image and an aerial image may be referred to as images of an area before the occurrence of an event, that is, reference image data, and an observation image may be referred to as an image of an area after the occurrence of an event, that is, observation image data. In case a shooting period corresponds to an occurrence time of an event, a satellite image and/or an aerial image may be utilized as an image after the occurrence of the event. As a satellite image and an aerial image are periodically obtained and an observation image is obtained by operating the unmanned aerial device 200 after the occurrence of an event, the present disclosure assumes that the satellite image and the aerial image function as a reference image to be compared with an observation image.

The input unit 120 may be an interface at which a manager inputs an instruction, data and a setting for implementing a method according to the present disclosure, and the output unit 130 may be an interface for providing a change map, an image and data, which are output by implementing the method according to the present disclosure, to the manager.

The memory 140 may store and manage software or an application associated with a method according to the present disclosure. The memory 140 may cumulatively manage a reference image that is periodically transmitted and, when an event occurs, store observation image data of a corresponding area. In addition, the memory 140 may store and manage an image, data and a change map that are generated by a method according to the present disclosure.

The processor 150 may execute software according to a method according to the present disclosure. Specifically, the processor 150 may detect an influence and a changed area according to an event in a region by utilizing pre-built reference image data and performing a comparative analysis with observation image data collected after the occurrence of the event. Based on the changed area and influence thus detected, the processor 150 may generate a change map in the region where the event occurs.

Figure 2:
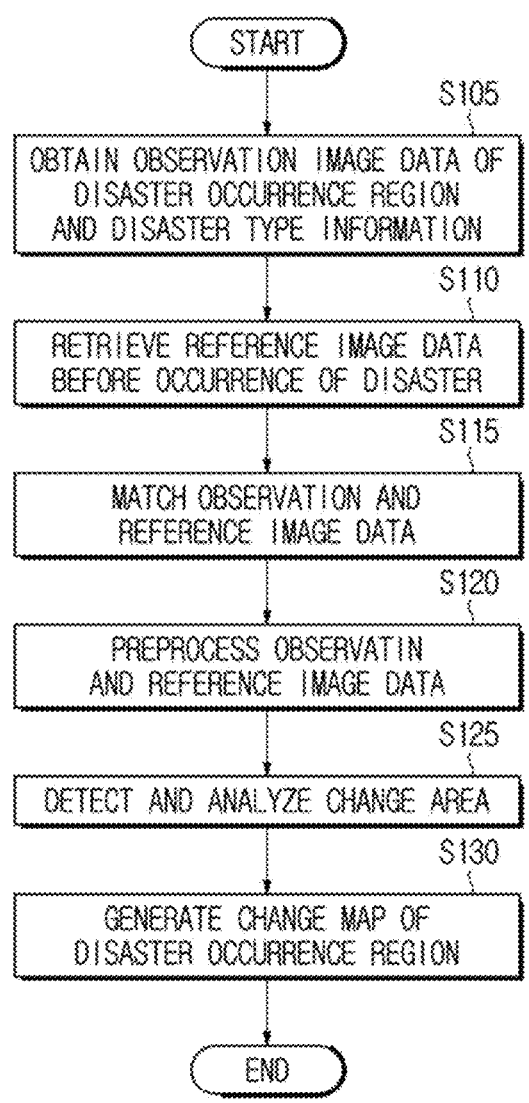
FIG. 2 is a flowchart for a method of detecting a change between heterogeneous image data according to another embodiment of the present disclosure.

FIG. 2 is a flowchart for a method of detecting a change between heterogeneous image data according to another embodiment of the present disclosure.

Hereinafter, the present disclosure assumes that an event is a disaster, a region where an event occurs is a damaged area of a disaster, and an event type is a disaster type. However, a disaster and a disaster type are a type of an event and an event type respectively, and an event and an event type are not limited to the above-described example but may be exemplified in various forms. For convenience of explanation, the event-related terms may be used interchangeably with the disaster-related terms.

First, the image change detection device 100 may obtain observation image data from the unmanned aerial device 200 operated in a region, where a disaster occurs, through the communication unit 110 and acquire disaster type information (S105).

The unmanned aerial device 200 may receive location information on the disaster occurrence region from an external management device, for example, a control server or another control server including the image change detection device 100, and approach the sky over the disaster occurrence region.

The control server may receive disaster occurrence information from a management server that manages the region where the disaster occurs. The disaster occurrence information may include location information of the disaster occurrence region, a disaster occurrence time, a disaster type, and a detailed range or area of a damaged region according to the disaster. The disaster type may be an event type according to the present disclosure, for example, landslide, flood, collapse of a bridge, forest fire, earthquake, and heavy snowfall. The disaster type information may be generated based on the disaster occurrence information. As another example, the disaster occurrence information may include location information, a disaster occurrence time, and a detailed range of a damaged region according to the disaster. In this case, the unmanned aerial device 200 may approach and photograph a disaster occurrence region and transmit observation image data to the image change detection device 100, and the processor 150 of the image change detection device 100 may generate disaster type information by analyzing the observation image data.

For example, observation image data may include an image of a disaster occurrence region, image location information, a shooting time of an image, an image property, and internal geometry information and external geometry information applied to an image. An image of a disaster occurrence region may be generated as an ortho-image with a high resolution, that is, a centimeter-level spatial resolution. An image property may be determined by a type of an observation image sensor installed, for example, in an image collection module of the unmanned aerial device 200. Accordingly, an image property may include information on a type of an observation image sensor. For example, types of observation image sensors may classified into, for example, a color (or RGB)-based optical sensor and a multispectral sensor. A multispectral sensor may be utilized according to a purpose and be configured as a near infrared (NIR) sensor.

Next, the processor 150 may retrieve reference image data of the region before the occurrence of a disaster (S110).

As an example, the processor 150 may retrieve reference image data of the region stored in the memory 140 by referring to location information of the disaster occurrence region. As another example, when no reference data is stored in the memory 140, the processor 150 may request reference image data of the region to a control server and obtain the reference image data through the communication unit 110.

Reference image data are constructed by a heterogeneous type of images from observation image data and may include, for example, at least one of a satellite image and an aerial image. For example, reference image data may include an image before the occurrence of a disaster in a region, an image acquisition means (satellite or aircraft), image location information, a shooting time, an image property, and internal geometry information and external geometry information applied to an image. For example, a satellite image may be an image that has a lower resolution than an aerial image and is obtained by a multispectral sensor. For example, an aerial image may be an ortho-image with a resolution of 12 cm or 25 cm. As described above, an image property may be determined by a type of a reference image sensor installed in an image collection module of the satellite 300a or the aircraft 300b. Accordingly, an image property may include information on a type of a reference image sensor. For example, types of reference image sensors may classified into, for example, a color (or RGB)-based optical sensor and a multispectral sensor.

Next, the processor 150 may mutually match observation image data and reference image data (S115).

Specifically, based on detailed location information, geometry information, and image types like ortho-image or vertical shot, the processor 150 may select reference image data corresponding to a disaster occurrence region of observation image data and match each piece of image data.

Observation image data and reference image data may include an error of geometric correction or ortho-image production. Such an error may have a subtle effect on an analysis for detecting a change area between observation image data and reference image data. Image correction may accompany to perform a comparative analysis by using data obtained from different platforms like the unmanned aerial device 200 and the airborne device 300 and different sensors of each platform. Image correction may minimize a location error between analyzed data.

In order to extract a matching point between an ortho-image of observation image data and a reference image, mutual matching may be performed by a process of extracting a feature point between two images and a process of finding a matching point between the two images. In order to extract a feature point, a deep learning-based matching algorithm such as R2D2, D2-Net, and SuperPoint may be used. Feature point extraction based on deep learning may use a convolutional neural network (CNN) that provides a location of a feature point (keypoint) within an image and information on a feature descriptor of the keypoint. For a feature point thus extracted, N matching pair combinations are selected, a graph is detected which shows a high correspondence according to a predetermined criterion, and an inlier below a threshold may be selected. Accordingly, a transform matrix for registration may be estimated. When image registration is performed using an estimated transform matrix, a matching pair with a reprojection error below a threshold may be determined as an ultimate matching pair.

Matching points extracted by a matching pair have image-based coordinates, and image registration may be performed through rigid transformation and affine transformation.

Affine transformation is a transformation including rotation, parallel movement, scale, shearing, and reflection and may be represented by Equation 1 below.

$$\begin{bmatrix} x_{ref} \\ y_{ref} \end{bmatrix} = \begin{bmatrix} a & b \\ c & d \end{bmatrix} \begin{bmatrix} x_{UAV} \\ y_{UAV} \end{bmatrix} + \begin{bmatrix} e \\ f \end{bmatrix} \qquad \text{Equation 1}$$

Here, ($x_{ref}$, $y_{ref}$) may be an extracted matching point of a reference image, ($x_{uav}$, $y_{uav}$) may be a matching point extracted from an ortho-image of observation image data, and a, b, c, d, e, f may be six parameters for affine transformation. Image transformation and registration may be performed using an estimated parameter, and a parameter may be estimated or determined according to a predetermined method.

Through the above-example for image matching and registration between an ortho-image of observation image data and a reference image, the influence of a geometric error may be minimized.

Next, the processor 150 may preprocess observation image data and reference image data that are mutually matched (S120).

Specifically, the processor 150 may process observation image data and reference image data according to an attribute of the observation image data. The processor 150 may preprocess the observation image data and the reference image data to determine whether or not there is an exceptional object not affected by a disaster and to process the exceptional object, in processed observation image data and processed reference image data, based on an event type, for example, based on a disaster type.

Figure 3:
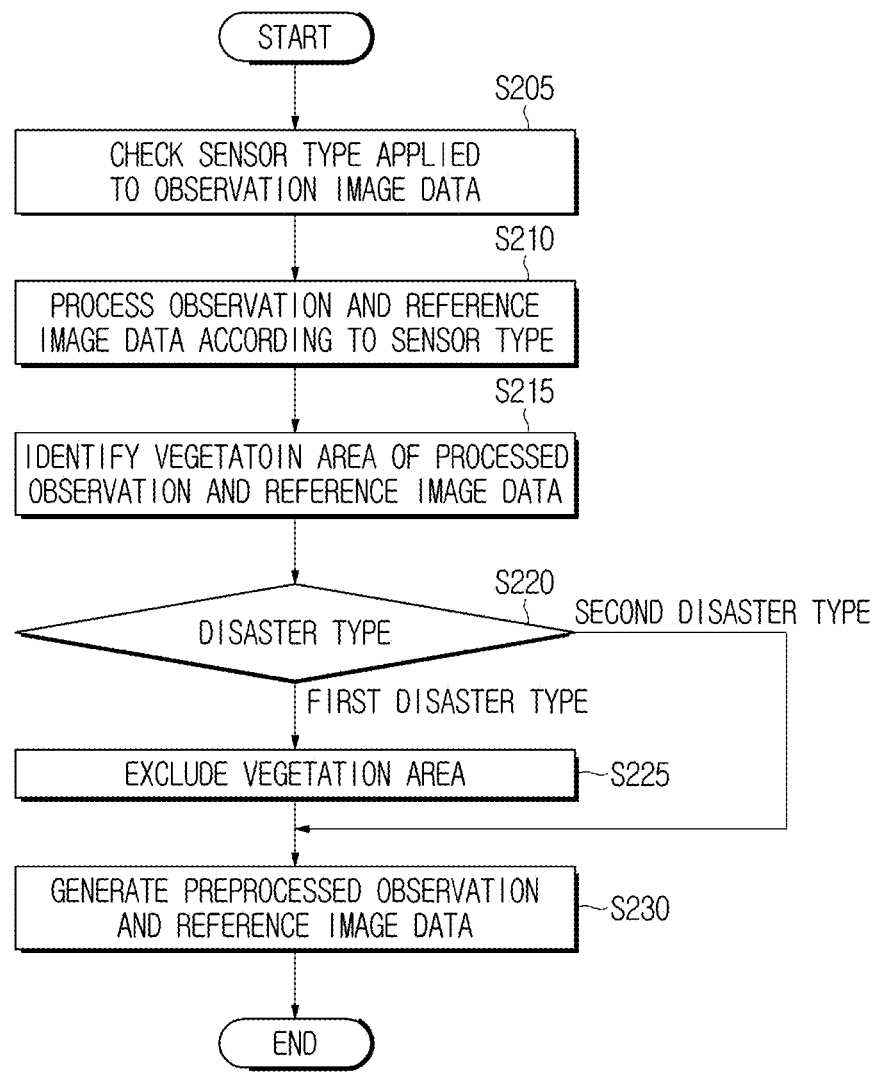
FIG. 3 is a flowchart for a preprocessing process of observation image data and reference image data.

Step S120 will be described in detail with reference to FIG. 3. FIG. 3 is a flowchart for a preprocessing process of observation image data and reference image data.

First, it is possible to identify an image attribute of observation image data, which is matched mutually with reference image data at step S115, for example, a type of an observation image sensor (S205).

As described above, a type of an observation image sensor may be an optical sensor with a RGB band or a multispectral sensor. An optical sensor may obtain a color image of an object by recognizing a color of an object. A multispectral sensor may identify an object with a specific spectral feature. For example, a multispectral sensor may identify an object with a specific spectral feature by sensing radiant energy reflected or emitted from the ground surface in less than 10 wavelength sections. For example, a multispectral sensor may be an NIR sensor.

Next, the processor 150 may process observation image data and reference image data according to a sensor type (S210) and identify a designated object, for example, a vegetation area from the processed observation and reference image data (S215).

When an event is a disaster, a designated object may be an object associated with, for example, vegetation or a vegetation area. The designated object is not limited thereto, and various designated objects may be determined according to an event type.

For the processing of step S210, among image data with a plurality of sensor types, image data corresponding to a type of an observation image sensor may be adopted as reference image data. The processor 150 may select reference image data with a same sensor type as a sensor type identified in observation image data.

When a type of an observation image sensor is an optical sensor, the processor 150 may select an aerial image obtained by a color-based optical sensor, for example, as reference image data to be processed. Based on a color associated with a designated object, the processor 150 may process observation image data and the selected reference image data to identify a vegetation area.

A forest may change according to seasons, and such a change may have a great effect on an analysis result, when change detection and analysis are performed. A designated object with high probability of change due to a seasonal factor or various factors may be an object associated with a vegetation area.

Furthermore, color-based identification of a designated object may be processed by using an index for identifying a designated object, for example, a vegetation index. Specifically, for an optical image with RGB band, a vegetation area may be detected by using vegetation indexes such as EGI (Excess Greenness Index) and VDVI (Visible-band Difference Vegetation Index). EGI and VDVI may be calculated by using a difference of digital number (DN) among red, green and blue bands of an image, as shown in Equation 2 and Equation 3 respectively.

$$EGI = 2 \times g - r - b \qquad \text{Equation 2}$$

Here, $r = \dfrac{Red}{Red + Green + Blue}$, $g = \dfrac{Green}{Red + Green + Blue}$, $b = \dfrac{Blue}{Red + Green + Blue}$ $$VDVI = \dfrac{2 \times Green - Red - Blue}{2 \times Green + Red + Blue} \qquad \text{Equation 3}$$

Figure 4:
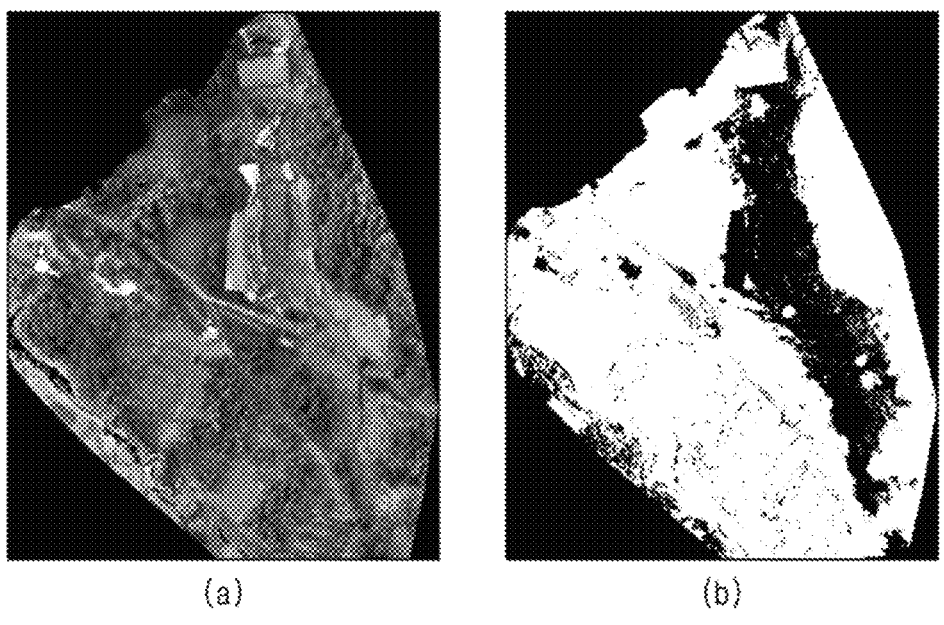
FIG. 4 is a view exemplifying an ortho-image of observation image data obtained by an optical sensor and an image of observation image data which is processed to identify a designated object in the ortho-image.

In the case of an optical sensor, an ortho-image of observation image data before processing and the observation image data processed by the vegetation index EGI are exemplified in (a) of FIG. 4 and (b) of FIG. 4 respectively. An aerial image of reference image data and the reference image data processed by a vegetation index may be processed like in FIG. 4. FIG. 4 is a view exemplifying an ortho-image of observation image data obtained by an optical sensor and an image of observation image data which is processed to identify a designated object in the ortho-image.

When a type of an observation image sensor is a multispectral sensor, the processor 150 may select a satellite image obtained by the multispectral sensor, for example, as reference image data to be processed. Since an image of a color-based optical sensor provides only a visible light channel, an image based on a multispectral sensor may be utilized for efficient image classification.

Based on a reflectance according to a specific wavelength associated with a vegetation area, the processor 150 may process observation image data and the selected reference image data to identify the vegetation area.

Identification of a designated object based on the reflectance may be processed by using an index for identifying a designated object, for example, EGI, VDVI and other vegetation indexes.

When a multispectral sensor is a near infrared (NIR) sensor, the multispectral sensor may identify a vegetation area by using NIR portion (about 760 to 900 nm) of spectrum. As sound vegetation tends to provide a high reflectance value than a visible band (RGB) in the spectral range, a multispectral sensor may use a reflectance of NIR band. For example, the normalized difference vegetation index (NDVI), which indexes the growth state of vegetation by a reflectance of NIR band, may be an index used for a vegetation analysis that utilizes a multispectral sensor. Such an index may be calculated by using Equation 4.

$$NDVI = \frac{NIR - RED}{NIR + RED} \qquad \text{Equation 4}$$

Next, the processor 150 may check a disaster type in disaster type information (S220), determine, according to the disaster type, whether or not a designated object corresponds to an exceptional object excluded from a change analysis, in processed observation image data and processed reference image data, and process the above pieces of image data according to the determination (S225).

Disaster types may be divided into, for example, forest fire, landslide, flood, bridge collapse, earthquake and the like. When a disaster type is a first disaster type, for example, landslide, flood, bridge collapse and earthquake, a vegetation area, which is a designated object, may correspond to an exceptional object that does not change before and after a disaster. In case of the first disaster type, the processor 150 may determine a vegetation area as an exceptional object in observation and reference image data and exclude the exceptional object. When there is no exceptional object like a vegetation area, the processor 150 may not perform exception processing for a specific object in observation and reference image data but retain every object in the image data.

On the other hand, when a disaster type is a second disaster type, for example, forest fire, since a vegetation area, which is a designated object, requires a change analysis before and after a disaster, it may not correspond to an exceptional object. In case of the second disaster type, a change detection and analysis using a vegetation index may be required for overall observation and reference image data. The processor 150 may determine the vegetation area not to correspond to an exceptional object of the second disaster type and process the processed observation image data and the processed reference image data so that the vegetation area can be retained.

To sum up, in case of the second disaster type like a forest fire, a sensitive analysis of a change of vegetation is needed, and a change in every vegetation needs to be detected and analyzed. On the other hand, in case of the first disaster type like a landslide, a flood, and a bridge collapse, a vegetation area subject to various changes including seasonal one may have a negative effect on an analysis result. Accordingly, a vegetation area may be determined as an exception object to be excluded from processed observation and reference image data, and thus the influence of seasonal change of vegetation may be minimized.

Next, observation image data and reference image data, for which an exceptional object is processed according to a disaster type, may be generated as preprocessed observation and reference image data (S230).

Referring to FIG. 2 again, the processor 150 may perform an analysis for detecting a change area in a disaster occurrence region based on the preprocessed observation image data and the preprocessed reference image data (S125).

Figure 5:
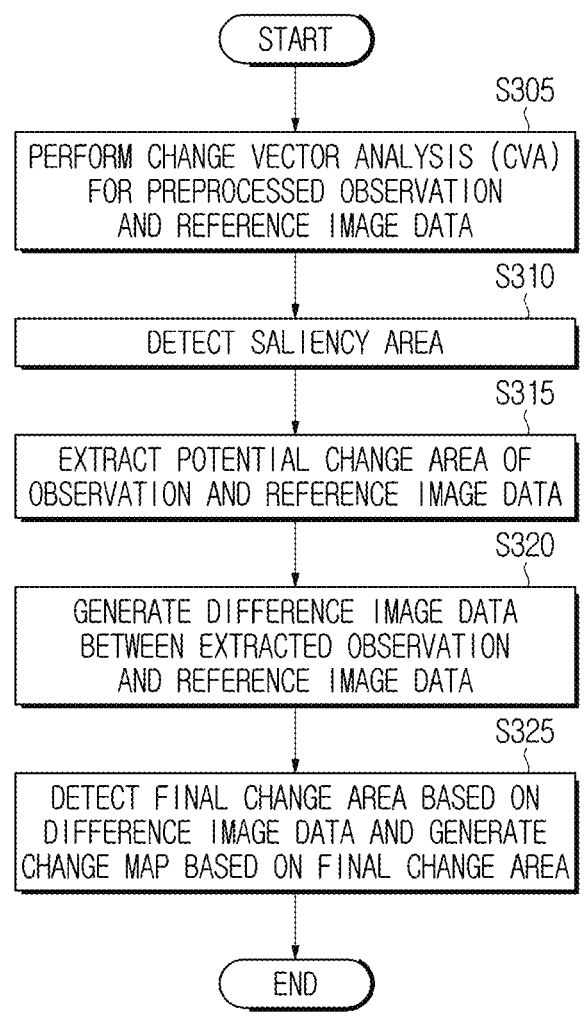
FIG. 5 is a flowchart for a process of detecting and analyzing a change area.

Step S125 will be described in detail with reference to FIG. 5. FIG. 5 is a flowchart for a process of detecting and analyzing a change area.

First, the processor 150 may apply a change vector analysis (CVA) to preprocessed observation image data and preprocessed reference image data (S305).

The CVA detects a change area by comparing pixel-unit radiance measurements and may be a technique of detecting a magnitude of change and a tendency of change. Specifically, the technique may estimate the size and direction of a change area by using the magnitude and direction of pixel vectors between observation image data and reference image data which are obtained at two different times. The magnitude of a vector means a magnitude of change, and a changed pixel may be identified by a predetermined threshold. The direction of a vector shows the tendency of a change occurring between observation and reference image data that are obtained at two times, and the direction of a change may be determined in various forms according to a feature between corresponding bands.

In order to analyze the direction and magnitude of a change in observation and reference images before and after occurrence of damage according to a disaster, a change vector for an image with n bands may be calculated as in Equation 5.

$$\Delta = \text{Image}_{after} - \text{Image}_{before} = \begin{bmatrix} \text{Image}_{after_1} - \text{Image}_{before_1} \\ \text{Image}_{after_2} - \text{Image}_{before_2} \\ \vdots \\ \text{Image}_{after_n} - \text{Image}_{before_n} \end{bmatrix} \qquad \text{Equation 5}$$

Here, Image_after may be an observation image, and Image_before may be a reference image.

When there are three bands of R, G and B, a change magnitude $\|\Delta\|$ may be obtained as in Equation 6.

$$\sqrt{(\text{Image}_{after_{RED}} - \text{Image}_{before_{RED}})^2 + (\text{Image}_{after_{GREEN}} - \text{Image}_{before_{GREEN}})^2 + (\text{Image}_{after_{BLUE}} - \text{Image}_{before_{BLUE}})^2} \qquad \text{Equation 6}$$

When $\|\Delta\|$ increases, it means that an observation image has a high probability to change, and pixels exceeding a specific threshold may be considered to have changed. A direction of a change is calculated for pixels that are considered as change, and the direction of the change may be calculated as in Equation 7.

$$\cos\theta_{RED} = \frac{\text{Image}_{after_{RED}} - \text{Image}_{before_{RED}}}{|\Delta|}, \qquad \text{Equation 7}$$

$$\cos\theta_{GREEN} = \frac{\text{Image}_{after_{GREEN}} - \text{Image}_{before_{GREEN}}}{|\Delta|},$$

$$\cos\theta_{BLUE} = \frac{\text{Image}_{after_{BLUE}} - \text{Image}_{before_{BLUE}}}{|\Delta|}$$

Figure 6:
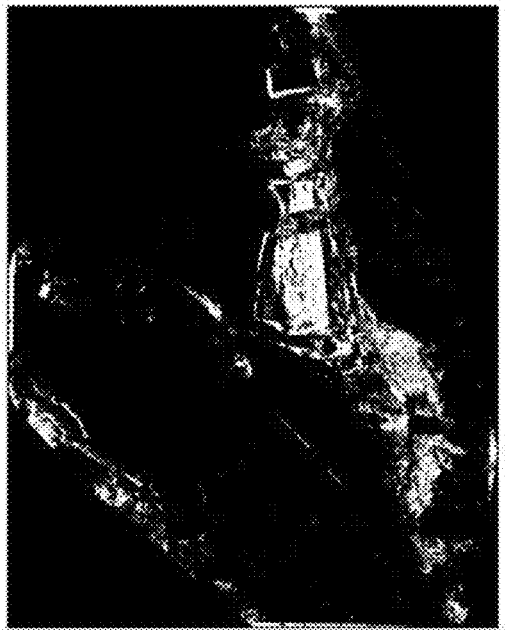
FIG. 6 is a view exemplifying an image analysis result obtained by applying a change vector analysis (CVA) to preprocessed observation or reference image data.

Observation or reference image data processed through the above-described process is exemplified in FIG. 6. FIG. 6 is a view exemplifying an image analysis result obtained by applying a change vector analysis (CVA) to preprocessed observation or reference image data.

Next, the processor 150 may detect a saliency area with a dissimilarity equal to or above a threshold based on observation image data and reference image data to which the analysis is applied (S310).

A processing result of each image, which is generated through the CVA technique of step S305, may be output by a pixel-based analysis, and many individual pixels considered as noise may be detected. Accordingly, in order to minimize the influence of noise, the processor 150 may identify a main area of change in each image and perform a secondary analysis of a detailed damaged area. A saliency detection method may be applied for identifying a main area of change.

Saliency detection may be a technique of identifying a part showing a change equal to or above a threshold, as compared with other parts. For example, for saliency detection, the processor 150 may generate a patch in each image, calculate similarity of patches thus generated for all the images, integrate local and global features, and define dissimilarity. The dissimilarity of two patches may be calculated through Equation 8.

$$d(m_i, n_j) = \frac{d_c(m_i, n_j)}{1 + c \cdot d_p(m_i, n_j)} \quad \text{Equation 8}$$

Here, $m_i$ and $n_j$ mean two patches in an image, and $d_c(m_i, n_j)$ may mean an Euclidean distance between vectorized $m_i$ and $n_j$ patches in a CIE LAB (L*a*b* color space) that expresses colors in numerical values. $d_p(m_i, n_j)$ may mean an Euclidean distance between positions $m_i$ and $n_j$.

Since a background pixel has a more similar patch on multiple scales, a combination of multiple scales is applied so that a larger contrast effect may appear between an area with a change equal to or above a threshold and an area with a change below the threshold. A saliency value of a patch $m_i$ on a scale r may be calculated as in Equation 9.

$$S_i^r = 1 - \exp\left\{-\frac{1}{K}\sum_{K=1}^{K} d(m_i^r, n_j^r)\right\} \quad \text{Equation 9}$$

As a saliency map and a closest patch of a point of interest should be applied on multiple scales, a saliency value of a patch $m_i$ may be calculated as in Equation 10.

$$\widehat{S}_i = \frac{1}{M} \sum_{r \in R} S_i^r \left(1 - d_{foci}^r(i)\right) \quad \text{Equation 10}$$

Here, M is the number of scales, and $d_{foci}^r(i)$ may mean a Euclidean distance between closest foci of a pixel of interest according to a pixel i and a scale r.

Figure 7:
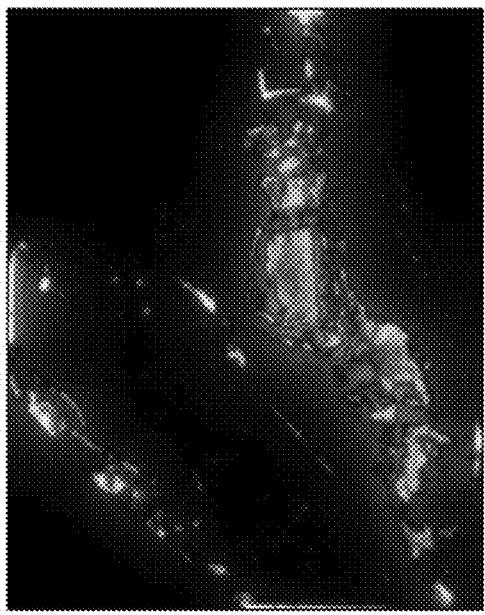
FIG. 7 is a view exemplifying an image result of a detected saliency area for observation or reference image data.

FIG. 7 exemplifies a saliency area detected from observation or reference image data through saliency detection. FIG. 7 is a view exemplifying an image result of a detected saliency area for observation or reference image data.

Next, the processor 150 may extract a saliency area detected from observation and reference image data as a potential change area (S315).

The processor 150 may identify an area with a change exceeding a threshold in observation and reference image data by applying the threshold to the saliency detection and analysis result according to step S310 and determine the identified area to be a potential change area.

In order to identify a detailed damaged area, which corresponds to the second phase of the change detection and analysis, the potential change area analyzed through a saliency map may be extracted, as shown in FIG. 8, from an original ortho-image (drone image) of the unmanned aerial device 200 and a reference image to display an area corresponding to the potential change area. FIG. 8 is a view exemplifying images of observation and reference image data from which a potential change area is extracted.

Next, the processor 150 may generate difference image data between the observation image data and the reference image data, from which the potential change area is extracted (S320).

The processor 150 may generate a difference image by differentiating the extracted ortho-image of the unmanned aerial device 200 and the reference image. For example, an eigenvector of a difference image may be obtained by using a principal component analysis (PCA), and a saliency vector for each pixel may be generated by projecting h x h neighborhood information onto an eigenvector space.

Next, the processor 150 may detect a final change area based on difference image data between observation image data and reference image data and generate a change map based on the final change area (S325).

For example, as a space according to the above-described saliency vector is divided into a changed region and an unchanged region through K-means clustering, the changed region may be detected as an final change area. K-means clustering may be performed by PCA K-means (Principal Component Analysis K-means).

Referring to FIG. 2 again, the processor 150 may determine an final change area of a change map to be a damaged area of a disaster occurrence region, generate a change map of the disaster occurrence region displaying the damaged area, and show it through the output unit 130 (S130).

As exemplified in (a) of FIG. 9, an analysis result according to a landslide may be output as a change map showing a landslide-damaged area 410. As exemplified in (b) of FIG. 9, an analysis result according to a flood may be output as a change map showing a flood-damaged area 420.

When change detection is performed between heterogeneous image data including an ortho-image of the unmanned aerial device 200, a satellite image and an aerial image, as different sensor types are applied to each image, a simple comparative analysis method like differentiation has a limitation in application. During a change detection process, the quality of a difference image may have a sensitive effect on the accuracy of an analysis result. In order to secure an analysis result with high accuracy, a method is required for minimizing the influence of noise, seasonal change, change of lighting and the like.

According to the present disclosure, in order to accurately detect a damaged area, observation and reference image data are processed and a detected change is analyzed according to a disaster type and a type of an installed sensor, and thus a change area before and after a disaster and a damaged area may be accurately detected.

In addition, a disaster-stricken area shows a different type of damage according to a damage type and a disaster occurrence region. According to the present disclosure, the detection accuracy of a damaged area may be further enhanced by considering a disaster type and a feature of a disaster occurrence region (e.g., vegetation area).

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some of the steps.

The various embodiments of the present disclosure are not a list of all possible combinations and are intended to describe representative aspects of the present disclosure, and the matters described in the various embodiments may be applied independently or in combination of two or more.

In addition, various embodiments of the present disclosure may be implemented in hardware, firmware, software, or a combination thereof. In the case of implementing the present invention by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

What is claimed is:

1. A method for detecting a change between heterogeneous image data, the method comprising:
   obtaining observation image data of an event occurrence region and reference image data that occurs before an event and has a heterogeneous type of an image from the observation image data;
   processing the observation image data and the reference image data according to an attribute of the observation image data and preprocessing the observation image data and the reference image data to determine whether or not there is an exceptional object to be excluded from a change analysis in the processed observation image data and the processed reference image data based on an event type and to process the exceptional object; and
   detecting a change area of the event occurrence region based on the preprocessed observation image data and the preprocessed reference image data,
   wherein the attribute of the observation image data is determined according to a type of an observation image sensor, and the type of the observation image sensor is an optical sensor with a RGB band or a multispectral sensor identifying an object with a specific spectral characteristic,
   wherein the processing of the observation image data and the reference image data comprises, based on a color associated with a designated object, processing to identify the designated object in the observation image data and reference image data with the type of the observation image sensor when the type of the observation image sensor is the optical sensor, and
   wherein the processing of the observation image data and the reference image data comprises, based on a reflectance according to a specific wavelength associated with the designated object, processing to identify the designated object in the observation image data and the reference image data with the type of the observation image sensor when the type of the observation image sensor is the multispectral sensor,
   wherein the preprocessing of the observation image data and the reference image data comprises:
   determining, based on the event type, whether or not the identified designated object is the exceptional object;
   excluding the exceptional object from the processed observation image data and the processed reference image data when the designated object is determined as the exceptional object; and
   maintaining the designated object in the processed observation image data and the processed reference image data when the designated object is determined not to correspond to the exceptional object.

2. The method of claim 1, wherein the observation image data is generated by using an unmanned aerial device, and
   wherein image data corresponding to the type of the observation image sensor, among a plurality of types of image data, is adopted as the reference image data.

3. The method of claim 1, wherein the detecting of the change area of the event occurrence region comprises:
   extracting a potential change area between the preprocessed observation image data and the preprocessed reference image data; and
   detecting a final change area based on difference image data between the observation image data and the reference image data in which the potential change area is extracted.

4. The method of claim 3, wherein the extracting of the potential change area comprises:
   applying a change vector analysis (CVA) to the preprocessed observation image data and the preprocessed reference image data; and
   detecting a saliency area with a dissimilarity equal to or above a threshold based on the observation image data and the reference image data to which the analysis is applied and extracting the detected saliency area as the potential change area.

5. The method of claim 3, wherein the detecting of the final change area based on the difference image data is performed by using principal component analysis K-means (PCA K-means) for the difference image data.

6. The method of claim 1, wherein the event is a disaster, the event occurrence region is a region damaged by the disaster, and the event type is a disaster type.

7. An apparatus for detecting a change between heterogeneous image data, the apparatus comprising:
   a communication unit configured to externally transmit and receive a signal;
   a memory configured to store at least one instruction; and
   a processor configured to execute the at least one instruction stored in the memory,
   wherein the processor is further configured to:
   obtain observation image data of an event occurrence region and reference image data that occurs before an event and has a heterogeneous type of an image from the observation image data,
   process the observation image data and the reference image data according to an attribute of the observation image data and preprocess the observation image data and the reference image data to determine whether or not there is an exceptional object to be excluded from a change analysis in the processed observation image data and the processed reference image data based on an event type and to process the exceptional object, and
   detect a change area of the event occurrence region based on the preprocessed observation image data and the preprocessed reference image data,
   wherein the attribute of the observation image data is determined according to a type of an observation image sensor, and the type of the observation image sensor is an optical sensor with a RGB band or a multispectral sensor identifying an object with a specific spectral characteristic,
   wherein the processing of the observation image data and the reference image data comprises, based on a color associated with a designated object, processing to identify the designated object in the observation image data and reference image data with the type of the observation image sensor when the type of the observation image sensor is the optical sensor, and wherein the processing of the observation image data and the reference image data comprises, based on a reflectance according to a specific wavelength associated with the designated object, processing to identify the designated object in the observation image data and the reference image data with the type of the observation image sensor when the type of the observation image sensor is the multispectral sensor, and the processor further configured to:

determine, based on the event type, whether or not the identified designated object is the exceptional object;

exclude the exceptional object from the processed observation image data and the processed reference image data when the designated object is determined as the exceptional object; and maintain the designated object in the processed observation image data and the processed reference image data when the designated object is determined not to correspond to the exceptional object.

\* \* \* \* \*